United States Patent [19]

Bowkley et al.

[11] 3,900,773

[45] Aug. 19, 1975

[54] ELECTRICAL CAPACITORS

[75] Inventors: Ian G. Bowkley; Nigel J. Goff, both of Leatherhead, England

[73] Assignee: E. R. A. Patents Limited, Leatherhead, England

[22] Filed: June 11, 1973

[21] Appl. No.: 368,833

[30] Foreign Application Priority Data

June 12, 1972 United Kingdom .............. 27298/72

[52] U.S. Cl. ................ 317/258; 106/53 C; 317/261

[51] Int. Cl. ............................................. H01g 1/01

[58] Field of Search .......... 317/258, 261; 106/53 C, 106/49

[56] References Cited

UNITED STATES PATENTS

| | | | |
|---|---|---|---|
| 3,195,030 | 7/1965 | Herczog | 317/258 |
| 3,267,342 | 8/1966 | Pratt | 317/261 X |
| 3,305,394 | 2/1967 | Kaiser | 317/258 |
| 3,544,330 | 12/1970 | Hoffman | 317/258 |
| 3,684,536 | 8/1972 | Hoffman | 106/53 C |

*Primary Examiner*—E. A. Goldberg
*Attorney, Agent, or Firm*—Kemon, Palmer & Estabrook

[57] ABSTRACT

An improvement in an electrical capacitor produced by printing on a ceramic substrate a thick film comprising a mixture of finely divided precious metal and powdered glass and firing this to form a base electrode, printing on the base electrode a thick film of high permittivity dielectric paste of the glass-ceramic type having a composition such that it re-crystallises during firing to produce a fine dispersion of high permittivity ferroelectric crystals throughout the layer and subsequently firing this layer; and printing over the two previous layers a thick film comprising a mixture of finely divided precious metal and glass and finally firing this to form a top electrode. The improvement consists in the fact that the glass included in the top electrode has the ability to soften in the temperature range 700°–850°C and on further heating to re-crystallise at temperatures below 1,000°C resulting in a glass-ceramic material having a minimum permittivity at room temperature of 50, thus giving a major increase in the capacitance of the resulting capacitor.

2 Claims, 4 Drawing Figures

ELECTRICAL CAPACITORS

Electrical capacitors suitable for inclusion in printed circuits may be produced by the screen printing of successive films constituting the basic elements of the capacitor. Films produced by printing in this way are known as "thick" films. The process may involve the following sequence of steps. The first step is to print on a ceramic substrate a thick film comprising a mixture of finely divided precious metal and glass and to fire this to form a base electrode. The base electrode is then over-printed with a thick film of high permittivity dielectric paste of the glass-ceramic type. This layer is dried but preferably not fired at this stage.

A third layer is then over-printed on the first two in the form of a thick film comprising a mixture of finely divided precious metal and glass constituting the top electrode and finally this layer and the previous dielectric layer are fired simultaneously to produce the complete capacitor. Since the films are printed in liquid form, the substrate must be lowermost and references to the "top" and "bottom" of a layer are intended to refer to the layer in the position originally printed. The same mixtures are normally used for both the base electrode and the top electrode, the primary function of the glass in the mixture being to provide, after firing, adhesion between the particles of precious metal and the underlying layer, i.e., the substrate or the dielectric layer respectively. The term "precious metal" as used herein is intended to cover any individual metal or alloy of the group consisting of platinum, gold, silver and palladium.

According to the present invention, the process just described is modified by using for the layer constituting the top electrode a glass having characteristics which are the same as or similar to those of the glass forming the dielectric layer, these being defined as the ability to soften in the temperature range 700°–850°C and on further heating to re-crystallise at temperatures below 1,000°C resulting in a glass-ceramic material having a minimum permittivity at room temperature of 50 and comprising a fine dispersion of high permittivity ferroelectric crystals throughout the layer. It is found that the substitution of a glass composition having these characteristics for the normal glass used previously for the top electrode leads to a surprising increase in the capacitance of the resulting capacitor, a factor which is of considerable technological importance. In general, it is found that the capacitance may be increased by a factor of between 2 and 3. The improvement is thought to stem from the fact that when the film constituting either electrode is fired, the particles of precious metal form a layer on top of the glass. Consequently, for the bottom electrode the glass constituent of the film lies effectively between the conducting layer of metal and the substrate. The glass therefore performs the function of an adhesive in securing the metal particles to the substrate and since it effectively lies outside the resultant capacitor it makes no contribution to the electrical properties of the capacitor and its own electrical properties are thus unimportant, its sole function being as an adhesive. On the other hand, the glass constituent of the top electrode, since it lies beneath the metal particles, does form part of the capacitor and effectively constitutes a further layer of dielectric (or an extension of the main layer). It is for this reason that the permittivity of this glass is important. If low permittivity glass is used as in the past, the capacity of the capacitor as a whole is reduced, while if in accordance with the present invention a high permittivity glass is used, the capacity is increased accordingly.

The glass to be included in the top electrode will in general comprise 30 to 90 weight per cent of one or more niobates selected from $NaNbO_3$, $CdNb_2O_6$, $SrNb_2O_6$, $PbNb_2O_6$, $Cd_2Nb_2O_7$, $Sr_2Nb_2O_7$, $Ba_2Nb_2O_7$ and at least one glass-forming oxide chosen from $B_2O_3$ and $SiO_2$. Examples of such glasses are disclosed in U.S. Pat. No. 3,195,030 to Herczog et al, the disclosure of which is incorporated herein by reference. It should be noted that only some of the examples disclosed in this Patent comply with the requirement stated above that the resultant glass-ceramic material should have a permittivity at room temperature of at least 50. Those glasses leading to a permittivity of less than 50 do not produce any significant improvement over and above the use of conventional low permittivity glass in the top electrode and do not, therefore, come within the scope of the present invention.

The following table gives some representative compositions of glasses which are particularly suitable for use in accordance with the present invention.

TABLE 1

GLASS COMPOSITIONS
Figures are Given in Weight Percent

| | A | B | C | D | E | F | G | H |
|---|---|---|---|---|---|---|---|---|
| $Nb_2O_5$ | 45.4 | 45.4 | 45.5 | 62.2 | 60.7 | 44 | 45.2 | 47.1 |
| $Na_2O$ | | | | 9.7 | 9.4 | | | |
| CdO | | | | 10.0 | 9.6 | | | |
| $TiO_2$ | | | | 6.0 | | | | |
| $SiO_2$ | 8.9 | 4.4 | 8.9 | 12.0 | 12.0 | 8.6 | 8.8 | 9.2 |
| $Ta_2O_5$ | | | | | 8.3 | | | |
| BaO | 13.8 | 13.8 | 13.8 | | | 16.1 | 8.0 | 17.3 |
| PbO | 19.6 | 19.6 | 19.7 | | | 23.1 | 23.8 | 11.6 |
| SrO | 7.9 | 7.9 | 7.9 | | | 3.8 | 9.8 | 10.2 |
| $Al_2O_3$ | 1.0 | 1.0 | | | | 1.0 | 1.0 | 1.0 |
| $B_2O_3$ | 3.5 | 8.0 | 4.2 | | | 3.4 | 3.5 | 3.6 |

The glasses listed in this table are suitable both for the top electrode and for the dielectric layer, either the same glass being used for both or different glasses for the two layers. The proportion of precious metal particles in the two electrodes is not critical and may range between 30 and 90 per cent by volume, the balance being glass. By suitable control of the printing process, the thickness of the resultant printed film may vary between about 10 and about 40 microns.

A number of capacitors were prepared using glasses from this table and their properties compared in order to illustrate the advantages arising from the invention. The steps in the production of each capacitor were the same and will be described with reference to the accompanying drawings, in which.

Figure 1:
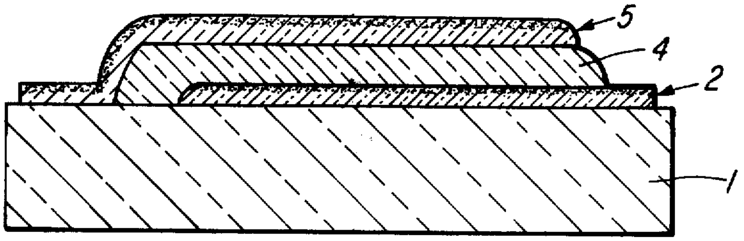
FIG. 1 is a cross section of a capacitance device in accordance with the present invention.

In the first step illustrated by FIG. 1 a rectangular insulating substrate 1 had printed on it a thick film 2 constituting the base electrode of the capacitor and formed with a lead-out conductor 3. The electrode had an area of 9 square millimetres and the base electrode in each case comprised 37% by volume of gold particles and 63% by volume of normal lead borosilicate glass. For printing purposes the constituents of the base electrode 2 and of each subsequent layer constituting the other components of the capacitor were dispersed in an organic vehicle comprising 5% N 50 ethyl cellulose dissolved in terpineol. After printing the film constituting the base electrode was fired at a peak temperature of 1,000°C. For the reasons previously explained the glass of the base electrode formed no functional component of the ultimate capacitor and the thickness of the layer was therefore not measured.

Figure 2:
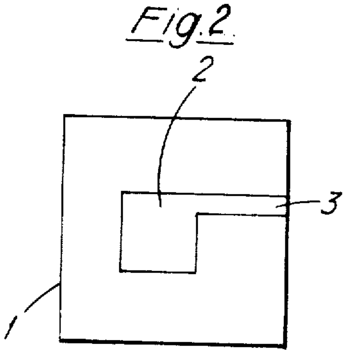
FIG. 2 shows the first stage in the production.
Figure 3:
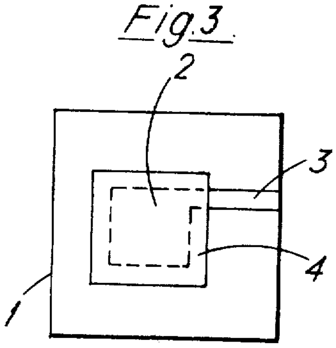
FIG. 3 shows the second stage.
Figure 4:
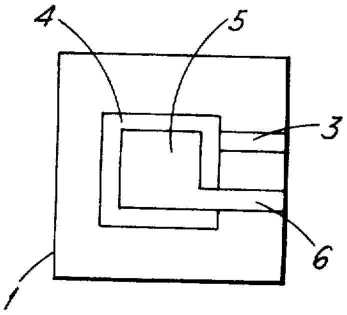
FIG. 4 shows the completed capacitor.

A layer of dielectric in the form of a thick film 4 was next printed on top of the base electrode as shown in FIG. 2. This layer is shown as being slightly larger than the base electrode 2 for purposes of illustration but in practice had the same area of 9 square millimetres. After printing, this layer was dried but not fired at that time. The glass used for this layer was selected from Table 1 and the layer had an ultimate thickness of approximately 37 microns. Finally a top electrode 5 having a lead-out conductor 6 was printed on top of the dielectric layer 4 and after drying both the dielectric layer 4 and the top electrode 5 were fired simultaneously at a peak temperature of 1,000°C. The thickness of the glass component of the top electrode was estimated to lie between 5 and 10 microns, but this could not be determined with accuracy since although, as mentioned above, the metal particles tend to form a layer on top of the glass, the boundary between the two layers is not clearly defined. The glass for the top electrode was selected from Table 1 and was mixed with a different proportion of precious metal particles in each example as set out in the following Table 2.

For comparison purposes a similar capacitor was prepared by an equivalent series of steps. This comparison capacitor had the same dimensions and the same constitution for the base electrode and the dielectric layer but the top electrode was of normal lead borosilicate glass mixed with the finely divided gold. In other words this comparison capacitor was produced in accordance with the prior art. The comparison capacitor had a capacitance of 504 pF whereas the capacitors prepared in accordance with the invention had a much higher capacity as shown in the following table:

TABLE 2

EXAMPLES OF CAPACITORS

| Example | Glass Used as Dielectric | Top Electrode Composition | | Capacitance |
|---|---|---|---|---|
| | | Metal | Glass | Value (pF) |
| (i) | A | 37 Vol% Pt. | 63 Vol% Glass B | 1224 |
| (ii) | A | 53 Vol% Au. | 47 Vol% Glass B | 1115 |
| (iii) | B | 37 Vol% Pt. | 63 Vol% Glass B | 743 |
| (iv) | B | 37 Vol% Au. | 63 Vol% Glass B | 947 |
| (v) | C | 70 Vol% Pt. | 30 Vol% Glass B | 1107 |
| (vi) | C | 37 Vol% Au. | 63 Vol% Glass C | 1575 |
| (vii) | C | 37 Vol% Au. | 63 Vol% Glass B | 1539 |
| (viii) | C | 37 Vol% Au. | 63 Vol% Glass A | 1323 |

This table shows the results of eight examples, all of which were prepared in the manner just described in which the glasses used for the dielectric and the top electrode were selected from those given in Table 1. The Table also shows the capacitance of the resultant capacitor, showing a marked increase over the comparison capacitor in each case.

We claim:

1. In an electrical capacitor comprising a ceramic substrate, a base electrode comprising a layer of finely divided precious metal, a first layer of glass adhering said base electrode to said substrate; a layer of glass-ceramic high permittivity dielectric comprising a fine dispersion of high permittivity ferroelectric crystals throughout said layer; a top electrode comprising a layer of finely divided precious metal and a second layer of glass adhering said top electrode to said layer of dielectric; the improvement which comprises said second layer of glass having the ability to soften in the temperature range 700°–850°C and on further heating to re-crystallize at temperatures below 1,000°C of compositions selected from the group consisting of A. 45.4% $Nb_2O_5$, 8.9% $SiO_2$, 13.8% BaO, 19.6% PbO, 7.9% SrO, 1% $Al_2O_3$ and 3.5% $B_2O_3$;

B. 45.4% $Nb_2O_5$, 4.4% $SiO_2$, 13.8% BaO, 19.6% PbO, 7.9% SrO, 1% $Al_2O_3$, 8.0% $B_2O_3$;

C. 45.5% $Nb_2O_5$, 8.9% $SiO_2$, 13.8% BaO, 19.7% PbO, 7.9% SrO and 4.2% $B_2O_3$;

D. 62.2% $Nb_2O_5$, 9.7% $Na_2O$, 10% CdO, 6% $TiO_2$ and 12% $SiO_2$;

E. 60.7% $Nb_2O_5$, 9.4% $Na_2O$, 9.6% CdO, 12% $SiO_2$ and 8.3% $Ta_2O_5$;

F. 44% $Nb_2O_5$, 8.6% $SiO_2$, 16.1% BaO, 23.1% PbO, 3.8% SrO, 1% $Al_2O_3$ and 3.4% $B_2O_3$;

G. 45.2% $Nb_2O_5$, 8.8% $SiO_2$, 8% BaO, 23.8% PbO, 9.8% SrO, 1% $Al_2O_3$ and 3.5% $B_2O_3$;

H. 47.1% $Nb_2O_5$, 9.2% $SiO_2$, 17.3% BaO, 11.6% PbO, 10.2% SrO, 1% $Al_2O_3$ and 3.6% $B_2O_3$, the stated percentages being the approximate percent by weight of the listed ingredients in said second layer of glass.

2. A capacitor as claimed in claim 1 wherein said layer of glass-ceramic high permittivity dielectric has substantially the same compositions as said second layer of glass.

* * * * *